Feb. 10, 1948.　　　R. V. ANDERSON　　　2,435,765
SAW TABLE
Filed Feb. 19, 1945　　　3 Sheets-Sheet 2
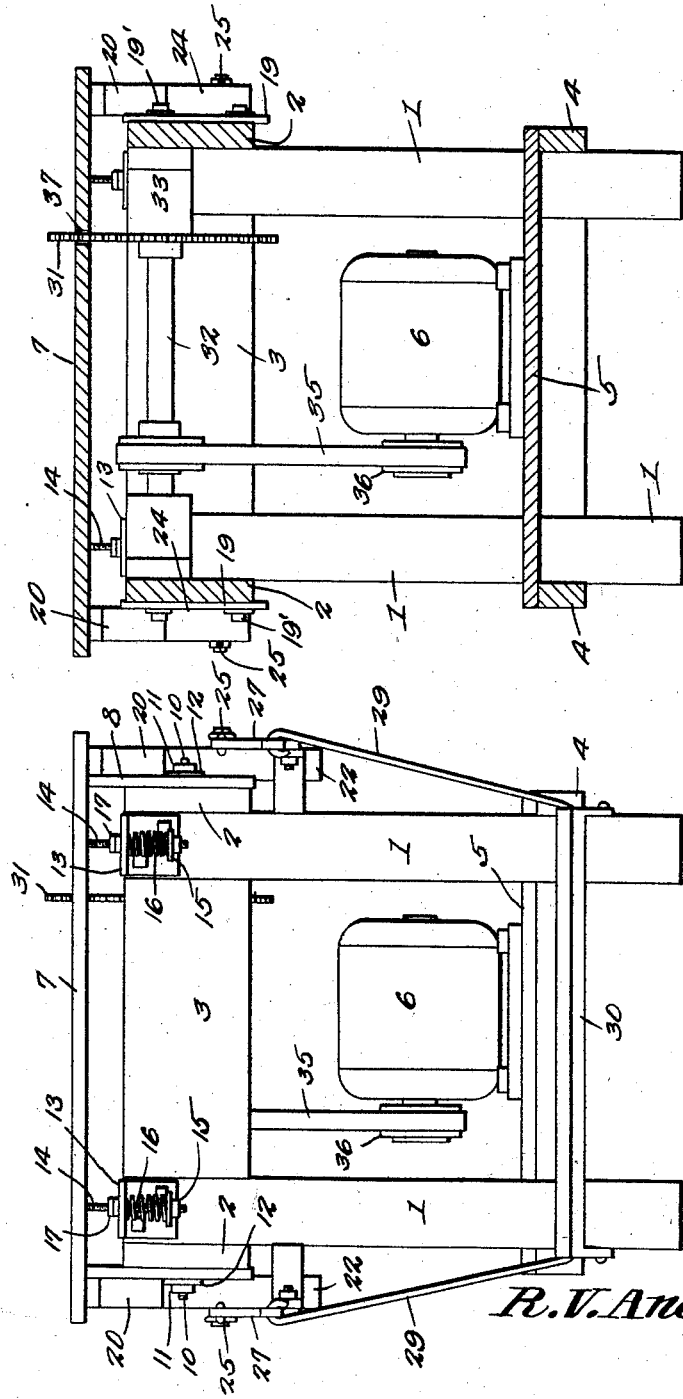
R. V. Anderson
INVENTOR.
BY
ATTORNEYS.

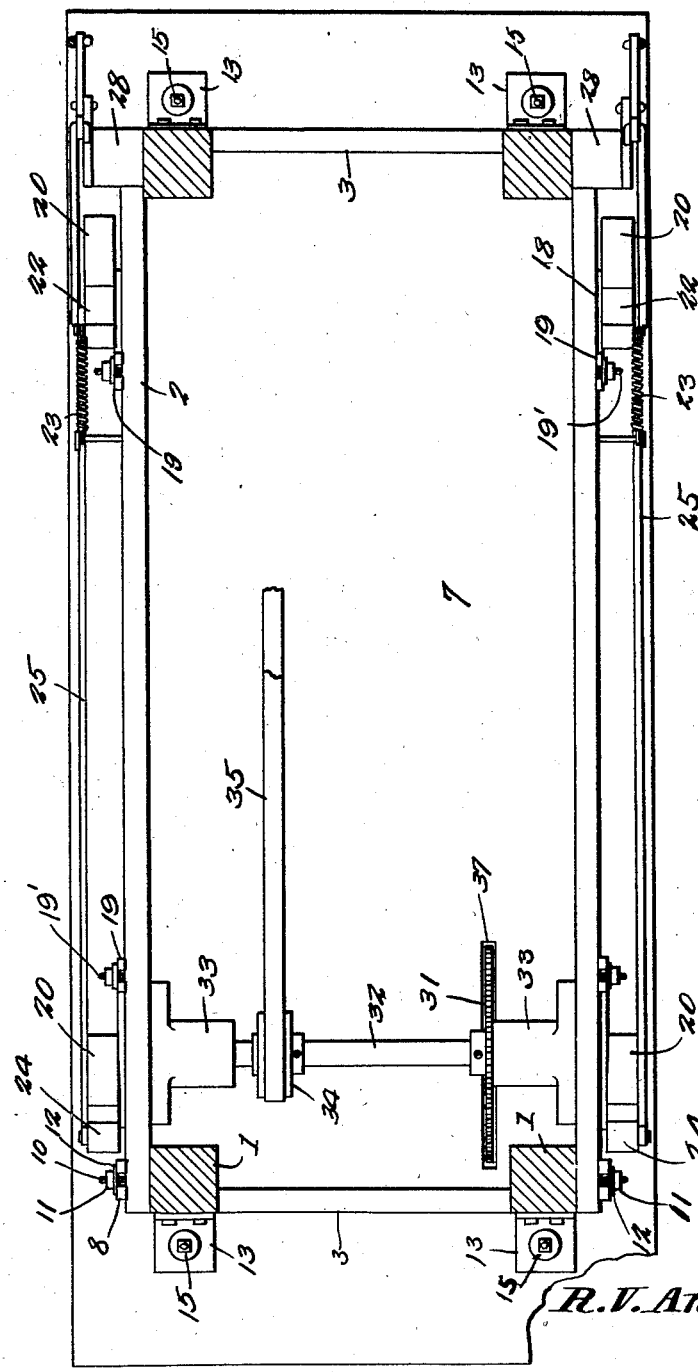

UNITED STATES PATENT OFFICE 2,435,765

SAW TABLE

Ralph V. Anderson, Valencia, Pa.

Application February 19, 1945, Serial No. 578,616

1 Claim. (Cl. 143—132)

This invention relates to tables for use in connection with power driven rotary saws and it is designed primarily for use where the saw is employed for grooving stock such, for example, as thicknesses of wood having fabric applied to one surface.

An object of the invention is to provide a table the top of which can be quickly raised by the user to bring the upper surface above the level of the saw so that stock thus can be slid in any direction over the saw into proper position to be cut.

Another object is to provide top shifting mechanism which is simple in construction and which can be operated easily by the user.

A further object is to provide adjustable means for supporting the top of the table normally at a predetermined angle and at a predetermined elevation relative to the saw.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as cla'med.

In the accompanying drawings the preferred form of the invention has been shown.

In said drawings

Figure 2 is a front elevation thereof.

Figure 3 is a section on line 3—3, Fig. 1.

Figure 4 is a section on line 4—4, Fig. 1.

Figure 1:
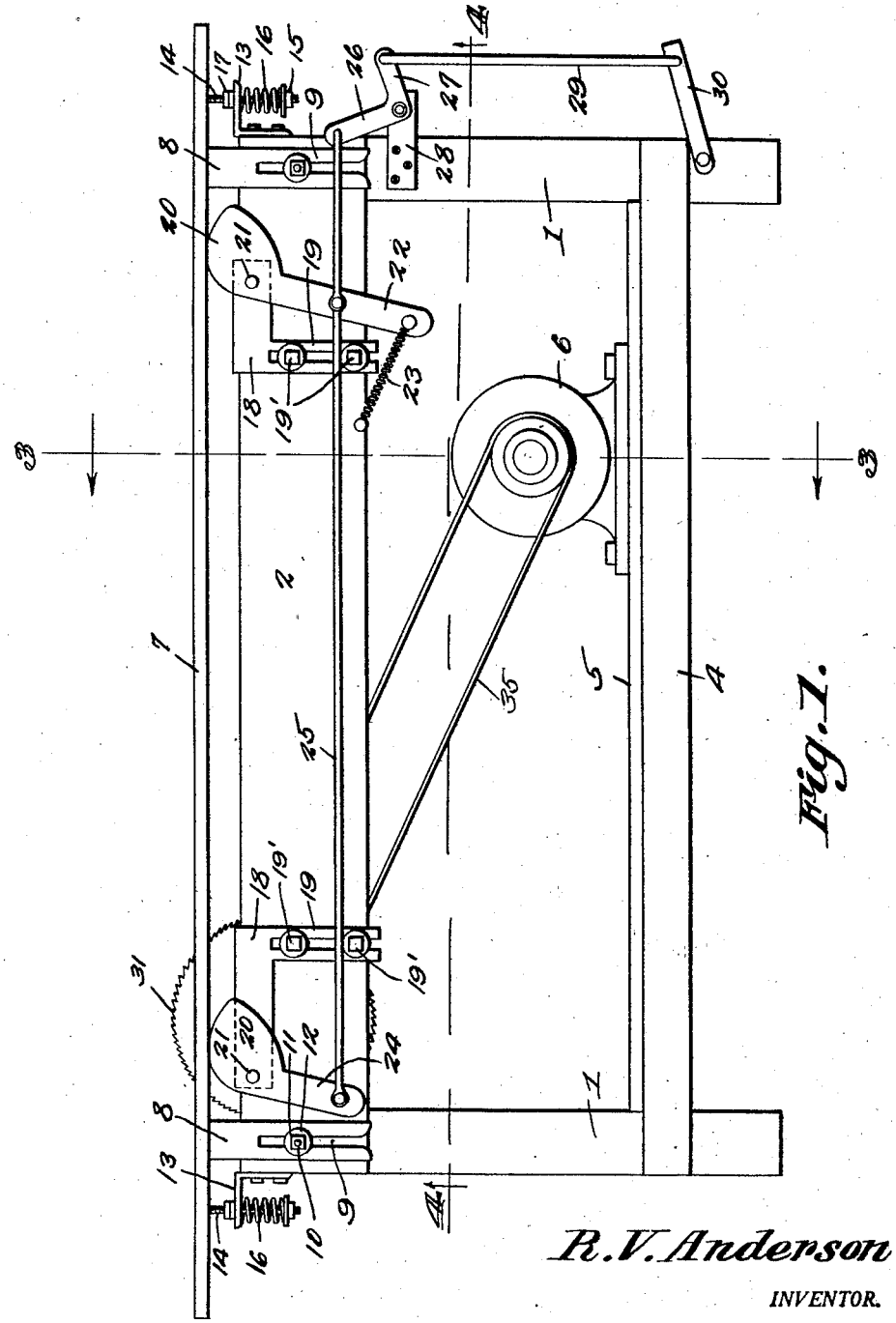
Figure 1 is a side elevation of the structure constituting the present invention.

Referring to the figures by characters of reference I designates the legs of a rigid supporting frame which includes side strips 2 and end strips 3 which join the upper ends of the legs, and bottom strips 4 which likewise connect the legs and serve the added purpose of supporting a base 5 on which an electric motor 6 can be mounted.

The table top has been indicated at 7 and is provided, adjacent to its corners, with guide strips 8 each of which is formed with a longitudinal slot 9. Guiding bolts are extended from the end portions of the side strips 2, as indicated at 10, and are seated in the respective slots 9, each of these bolts being provided with holding means, such as a nut 11 and a washer 12, for holding the strip 8 properly assembled with the strip 2 but at the same time permitting strips 2 to slide upwardly and downwardly.

Brackets 13 are secured to and extended away from the end strips 3 and slidably mounted in each of these brackets is a screw threaded rod 14 having a head 15 at its lower end. Interposed between this head and the bracket is a coiled spring 16 which is maintained constantly under compression by nuts 17 which are adjustably mounted on the rod and are positioned above and in contact with the bracket 13. The rods 14 are connected to the table 7. When the top 7 is in its normal position with nuts 17 resting on the brackets 13, obviously by adjusting these nuts the compression of the springs can not only be regulated but the angle and elevation of the table can be regulated to meet the requirements of the user.

Mounted on each of the side strips 2 adjacent to but between the strips 8 are plates 18 provided with slotted arms 19 extended downwardly therefrom and adjustably held to the side strips 2 by clamping bolts 19'. Cams 20 are connected to the plates 18 by pivot pins 21 and one of these cams has an elongated arm 22 extended therefrom. This arm is held normally in one extreme position by a coiled spring 23 which connects it to the adjoining side strip 2. The other cam at each side of the structure has a shorter arm 24 extended therefrom.

From the foregoing description it will be noted that two pairs of cams are provided, one pair being located at each side of the structure and one cam of each pair having a spring restrained arm. All of the cams are of the same size and proportions and all of them are extended in the same direction. The cams of each pair are joined by a connecting rod 25 and both of these are also extended forwardly and joined to the upper arms 26 of bellcranks 27 fulcrumed on brackets 28 secured to the front legs I. Rods 29 connect the lower arms of these bellcranks to a treadle 30 pivotally connected to and extending forwardly from the front legs I.

The parts are so proportioned that when the top 7 is resting on the rods 14, it also engages all of the cams 20.

A circular saw 31 is carried by a shaft 32 which is journaled in suitable bearings 33 carried by the side strips 2. A pulley 34 is also secured to shaft 32 and receives motion through a belt 35 from a pulley 36 on the shaft of motor 6. The saw 31 is positioned where it can project into a slot 37 formed in the top 7.

As before explained the top 7 is supported by the rods 14. These rods can be adjusted not only to vary the compression of the springs 16 but also to maintain the top normally at any desired elevation and at a desired pitch, either lateral or longitudinal. After the top has been properly adjusted, the treadle 30 is depressed. This will cause all of the cams 20 to be actuated simultaneously and to the same extent, the movement of the cams being such as to lift the table 7 from its normal position and until its top surface is brought above the top level of the saw.

While the table top is in its raised position the springs 16 are held under compression thereby due to the upward pull of heads 15 against the springs. With the table top thus supported any work mounted thereon can be slid into position over the saw and after the work has been properly located the treadle can be released and the top 7 will move downwardly so as to expose the saw thereabove to make a cut of the desired depth. The drop of the table top when the treadle is released will be limited by the adjustable nuts 17 and will be accelerated by the compressed springs 16. The top will also be properly guided during its upward and downward movement by the cooperating strips 8 and bolts 10. It has been found in practice that by providing a table top adjustably supported as described and capable of up and down movement by a means such as herein disclosed, the work of grooving can be expedited and, because of accuracy of the cuts as to their depth, the invention is especially useful in grooving wood having a top layer of fabric. The invention is also advantageous because when the top is raised, work supported on the top can be slid freely over any portion thereof without danger of contacting the rotating saw.

What is claimed is:

A saw table including a supporting structure having a motor driven rotary saw, a table top having a slot positioned to receive the saw, members on the structure adjustable toward or from said top, cams movably mounted on said members and engaging the top, means under the control of an operator for simultaneously actuating the cams to lift the top relative to the structure and saw when said members are in any selected position, cooperating means on the top and the structure for guiding the top during said movement, and spring restrained means carried by the top and movably connected to the structure for resisting the lifting action of the top.

RALPH V. ANDERSON.

REFERENCES CITED

The following references are of record in the file of this patent:

UNITED STATES PATENTS

| Number | Name | Date |
|---|---|---|
| 225,323 | Bennett | Mar. 9, 1880 |
| 501,521 | Marsh | July 18, 1893 |
| 1,044,816 | Phillipson | Nov. 19, 1912 |

FOREIGN PATENTS

| Number | Country | Date |
|---|---|---|
| 140 | Great Britain | Jan. 3, 1899 |